(12) United States Patent
Sultan et al.

(10) Patent No.: US 7,893,132 B2
(45) Date of Patent: Feb. 22, 2011

(54) POWER OR COMMUNICATIONS CABLE WITH FLAME RETARDANT POLYMER LAYER

(75) Inventors: Bernt-Åke Sultan, Stenungsund (SE); Jonas Jungkvist, Göteborg (SE); Urban Andreason, Ödsmål (SE); Lars-Erik Ahlstrand, Ucklum (SE)

(73) Assignee: Borealis Technology Oy, Porvoo (FI)

( * ) Notice: Subject to any disclaimer, the term of this patent is extended or adjusted under 35 U.S.C. 154(b) by 647 days.

(21) Appl. No.: 11/884,504

(22) PCT Filed: Feb. 22, 2006

(86) PCT No.: PCT/EP2006/001618

§ 371 (c)(1),
(2), (4) Date: Oct. 22, 2007

(87) PCT Pub. No.: WO2006/089735

PCT Pub. Date: Aug. 31, 2006

(65) Prior Publication Data

US 2008/0188589 A1    Aug. 7, 2008

(30) Foreign Application Priority Data

Feb. 23, 2005    (EP)    ................................. 05003931

(51) Int. Cl.
*H01B 3/34* (2006.01)
(52) U.S. Cl. ........................ 523/173; 523/206; 523/213
(58) Field of Classification Search ................. 523/173, 523/206, 213
See application file for complete search history.

(56) References Cited

U.S. PATENT DOCUMENTS 4,265,801 A    5/1981    Moody et al.
2001/0025720 A1 *  10/2001    Bisleri et al. ............ 174/120 R

FOREIGN PATENT DOCUMENTS

| EP | 0 393 959 | | 10/1995 |
|---|---|---|---|
| EP | 0 393 959 B1 | * | 10/1995 |
| WO | WO 98/12253 | | 3/1998 |
| WO | WO 02/26879 | | 4/2002 |

OTHER PUBLICATIONS

International Search Report for International Application No. PCT/EP/2006/001618.

* cited by examiner

*Primary Examiner*—Robert D. Harlan
(74) *Attorney, Agent, or Firm*—Fay Sharpe LLP

(57) ABSTRACT

The present invention in a first embodiment relates to a conduit or automotive wire consisting of an inner conductor core surrounded by a flame retardant layer made of a polymer composition in a continuous process which composition comprises (A) an olefin homo- and/or copolymer, (B) a silicone-group containing compound, and (C) an inorganic filler, wherein the ratio of the MFR2 measured under a load of 2.16 kg and at a temperature of 190° C. of component (A) to the MFR2 measured under a load of 2.16 kg and at a temperature of 190° C. of the composition is higher than 3.5, and the wire has a length of at least 100 m. In a second embodiment, the present invention relates to a power or communications cable or wire comprising a flame retardant layer made of a polymer composition comprising (A) an olefin homo- and/or copolymer, (B) a silicone-group containing compound, and (C) an inorganic filler, wherein the ratio of the MFR2 measured under a load of 2.16 kg and at a temperature of 190° C. of component (A) to the MFR2 measured under a load of 2.16 kg and at a temperature of 190° C. of the composition is higher than 3.5, the cable or wire further comprising at least one further layer.

24 Claims, No Drawings

POWER OR COMMUNICATIONS CABLE WITH FLAME RETARDANT POLYMER LAYER

The present invention relates to a power or communications cable or wire, in particular to a conduit and/or automotive wire, with a polymer layer formed of a flame retardant composition comprising an olefin polymer, a silicon group containing compound and an inorganic filler. Furthermore, the present invention relates to a process for the production of such a power or communications cable or wire, in particular conduit or automotive wire, and to the use of said flame retardant polymer composition for the production of a power or communications cable or wire, in particular a conduit and/or automotive wire.

Polyolefins are inherently combustible materials. However, in many applications flame resistance is required such as for cables and wires in the Electronics and Electrical industries. To obtain polyolefin polymers with improved flame resistance it is known to incorporate specific additives into the polymer, such as halogen based chemicals, phosphate based chemicals or inorganic hydroxide/hydrated compounds. Each of these additives have their own deficiencies, such as incompatibility with the polyolefin, the need for high loading levels leading to poor mechanical properties and poor processability, the presence or emission of harmful, toxic or otherwise undesirable compounds and high costs.

For example, as disclosed in EP 0 393 959 or WO 98/12253, a flame retardant polymer composition may comprise a silicon-group containing compound, an inorganic filler which is neither a hydroxide nor a substantially hydrated compound and an organic polymer matrix typically comprising an acrylate or acetate. The flame retardancy of such compositions is based on synergistic effects between these three components which in case of burning lead to the formation of a physically and firmly stable char layer that protects the polymer from further burning. Compounds based on such compositions usually show good flame retardancy, e.g. in the limiting oxygen index (LOI) test method according to ISO 4589-A-IV. However, these compositions still need to be improved in terms of certain flame retardant properties, including the performance in the single wire burning test, processing properties and mechanical properties, such as abrasion resistance, in particular with regard to their application in conduit or automotive wires.

Conduit or automotive wires are cables which apart from a conducting core and an optional thin skin layer only comprise one polymer layer. This layer accordingly must fulfil several functions at the same time, which e.g. in medium and high voltage cables are fulfilled by separate layers. These functions comprise those of an insulation layer and an outer, protecting jacket.

Power cables other than conduit or automotive wires, in particular high and medium voltage cables, and communications cables usually in addition to the flame retardant layer comprise further layers, e.g. an insulating layer.

A polymer composition used for the production of a power or communications cable or wire, in particular a conduit or automotive wire, must meet several demanding requirements at the same time, including good insulation behaviour, good mechanical properties, in particular good abrasion resistance, good flame retardant properties, in particular good performance in the single wire burning test according to EN 60332-1 and good dripping behaviour, and good processing properties.

Optionally, the conduit or automotive layer may further have a skin layer which may be coloured. However, said skin layer does not contribute to any significant extent to meet the requirements and to fulfil the functions of the sole polymer layer of a conduit or automotive wire as discussed above.

It is therefore an object of the present invention to provide a flame retardant polymer composition with improved flame retardancy and, at the same time, good mechanical, in particular abrasion, properties and good processing behaviour for use in power or communications cable or wire, in particular in a conduit or automotive wire.

It has now surprisingly been found that the objects of the present invention can be simultaneously achieved by using a polymer composition for the production of a flame retardant layer which comprises an olefin homo- and/or copolymer and in which the ratio of the $MFR_2$ measured under a load of 2.16 kg and at a temperature of 190° C. of said olefin homo- and/or copolymer to the $MFR_2$ measured under a load of 2.16 kg and at a temperature of 190° C. of the composition is higher than 3.5.

Therefore, the present invention in a first embodiment provides a conduit or automotive wire consisting of an inner conductor core surrounded by the flame retardant layer made of a polymer composition in a continuous process which composition comprises (A) an olefin homo- and/or copolymer,
(B) a silicone-group containing compound, and
(C) an inorganic filler, wherein the ratio of the $MFR_2$ measured under a load of 2.16 kg and at a temperature of 190° C. of component (A) to the $MFR_2$ measured under a load of 2.16 kg and at a temperature of 190° C. of the composition is higher than 3.5, and the wire has a length of at least 100 m.

The feature that the flame retardant layer has been made in a continuous process and that the length of the wire is at least 100 m signifies that the cable has been produced on an industrial scale facility for commercial purposes and not only e.g. for testing purposes on a laboratory extrusion line. Preferably, the length of the wire is at least 500 m and more preferably, the length is at least 1000 m.

The present invention in a second embodiment provides a power or communications cable or wire comprising a flame retardant layer made of a polymer composition comprising (A) an olefin homo- and/or copolymer,
(B) a silicone-group containing compound, and
(C) an inorganic filler, wherein the ratio of the $MFR_2$ measured under a load of 2.16 kg and at a temperature of 190° C. of component (A) to the $MFR_2$ measured under a load of 2.16 kg and at a temperature of 190° C. of the composition is higher than 3.5, and wherein the cable or wire further comprises at least one further layer.

The further layer or layers of the cable or wire of this embodiment is/are present in addition to the flame retardant layer. Preferably, the further layer present in the cable or wire is a polymeric layer.

In communication cables or wires, usually at least an insulation layer is present as a further layer. Such insulation layers usually are made of a polymeric material without flame retardant additives.

In power cables or wires, usually an outer protective jacket is present as a further layer. Such jackets are usually made of a polymeric material and may also contain flame retardant additives. Furthermore, also an insulation layer often is present in power cables or wires which may or may not comprise flame retardant additives.

The polymer composition used in any embodiment of the present invention for the preparation of the flame retardant layer is preferably completely free of any halogen-containing compounds.

The wire or cable according to any embodiment of the invention shows improved flame retardancy as it passes the single-wire burning test and shows improved dripping properties. At the same time, the wire or cable shows superior abrasion resistance and processing properties.

The purpose of the test method EN 60332-1 (single wire burning test) is to determine the resistance to flame propagation for single vertical cables. The cable (600 mm) is installed in a vertical position and a 1 kW flame produced by a propane burner is applied onto the cable sample at a 45° angle 475 mm from the upper support of the cable. The distance between the lower and upper support should be 550 mm. For cables having an outer diameter of less than 25 mm the flame is applied for 60 seconds. In order to fulfil the test, the flame should extinguish after the propane burner flame has been taken away and no charring should be visible within 50 mm from the upper support and below 540 mm.

In the first embodiment of the invention the flame retardant layer preferably has a thickness of 0.1 to 4 mm.

Further in this embodiment the wire preferably further has an outer skin layer with a maximum thickness of 0.4 mm.

Preferably, the outer skin layer is made of a halogen-free polyolefin based polymer composition.

Still further, in the wire according to the first embodiment of the invention the conductor area is from 0.1 to 400 mm$^2$.

In the second embodiment of the invention, the power or communications cable or wire preferably is produced in a continuous process and has a length of at least 100 m, more preferably at least 500 m and most preferably at least 1000 m.

Furthermore, preferably in this embodiment, the thickness of the flame retardant polymer layer in the wire is from 0.1 to 50 mm.

Further preferred, the thickness of the insulating layer is from 0.3 to 4 mm.

Still further in this embodiment, the area of the inner core consisting of the electrical or signal conductors preferably is from 0.3 to 400 mm$^2$ diameter.

In the following, preferred features of the cable or wire of both above described embodiment of the invention are described.

Preferably, the flame retardant layer is produced by extruding the polymer composition comprising components (A) to (C). Preferably, the flame retardant layer is extruded with a line speed of at least 20 m/min.

Furthermore, it is preferred that the flame retardant layer is extruded with a pressure of at least 50 to 500 bar.

In the composition according to the invention, the choice and the composition of olefin homo- and/or copolymer (A) may vary. Of course, olefin polymer (A) may also comprise a mixture of different olefin polymers.

Component (A) is formed by olefin, preferably ethylene, homo- and/or copolymers. These include, for example, homopolymers or copolymers of ethylene, propylene and butene and polymers of butadiene or isoprene. Suitable homopolymers and copolymers of ethylene include low density polyethylene, linear low, medium or high density polyethylene and very low density polyethylene. Suitable ethylene copolymers include such with of $C_3$- to $C_{20}$-alpha-olefins, $C_1$- to $C_6$-alkyl acrylates, $C_1$- to $C_6$-alkyl methacrylates, acrylic acids, methacrylic acids and vinyl acetates. Preferred examples for the alkyl alpha-olefins are propylene, 1-butene, 4-methyl-1-pentene, 1-hexene and 1-octene.

Silane-crosslinkable polymers may also be used, i.e. polymers prepared using unsaturated silane monomers having hydrolysable groups capable of crosslinking by hydrolysis and condensation to form silanol groups in the presence of water and, optionally, a silanol condensation catalyst.

In a further preferred embodiment of the inventive composition component (A) comprises, preferably consists of, an olefin copolymer, preferably a polar olefin copolymer.

Polar groups are defined to be functional groups which comprise at least one element other that carbon and hydrogen.

Preferably, the comonomer content of the olefin copolymer is from 2 to 40 wt %, more preferably is from 4 to 20 wt % and most preferably is from 6 to 12 wt %

Further preferred, the polar copolymer is an olefin/acrylate, preferably ethylene/acrylate, and/or olefin/acetate, preferably ethylene/acetate, copolymer.

It is further preferred that the polar copolymer comprises a copolymer of an olefin, preferably ethylene, with one or more comonomers selected from $C_1$- to $C_6$-alkyl acrylates, $C_1$- to $C_6$-alkyl methacrylates, acrylic acids, methacrylic acids and vinyl acetate. The copolymer may also contain ionomeric structures (like in e.g. DuPont's Surlyn types).

Further preferred, the polar polymer comprises a copolymer of ethylene with $C_1$- to $C_4$-alkyl, such as methyl, ethyl, propyl or butyl, acrylates or vinyl acetate.

It is further preferred that the polar polymer comprises a copolymer of an olefin, preferably ethylene, with an acrylic copolymer, such as ethylene acrylic acid copolymer and ethylene methacrylic acid copolymer.

In addition to ethylene and the defined comonomers, the copolymers may also contain further monomers. For example, terpolymers between acrylates or methacrylates and acrylic acid or methacrylic acid, or acrylates or methacrylates with vinyl silanes, or acrylates or methacrylates with siloxane, or acrylic acid or methacrylic acid with siloxane may be used.

The polar copolymer may be produced by copolymerisation of the polymer, e.g. olefin, monomers with polar comonomers but may also be a grafted polymer, e.g. a polyolefin in which one or more of the comonomers is grafted onto the polymer backbone, as for example acrylic acid or maleic acid anhydride-grafted polyethylene or polypropylene.

In a particularly preferred embodiment, component (A) of the polymer composition used for the flame retardant layer comprises, preferably makes up at least 25 wt %, more preferably at least 35 wt % and most preferably consists of, a copolymer or a mixture of copolymers of an olefin, preferably ethylene, with one or more comonomers selected from the group of non-substituted or substituted acrylic acids according to formula (I):

$$H_2C=CR-COOH \qquad (I)$$

wherein R is H or an organic substituent, preferably R is H or a hydrocarbon substituent.

More preferably, the type of comonomer is selected from the group of acrylic acid according to formula (I) wherein R is H or an alkyl group, still more preferably R is H or a $C_1$- to $C_6$-alkyl substituent.

It is particularly preferred, that the type of comonomer is selected from acrylic acid and methacrylic acid, and most preferably, the comonomer is methacrylic acid.

These copolymers may be crosslinked after extrusion, e.g. by irradiation. Silane-crosslinkable polymers may also be used, i.e. polymers prepared using unsaturated silane monomers having hydrolysable groups capable of crosslinking by hydrolysis and condensation to form silanol groups in the presence of water and, optionally, a silanol condensation catalyst.

In addition to olefin, preferably ethylene, monomers and the above-defined comonomers, the copolymers may also contain further monomers. For example, terpolymers with further, different alpha-olefin comonomers, such as propylene, 1-butene, 4-methyl-1-pentene, 1-hexene and 1-octene, or with vinyl silanes and or siloxane may be used.

Copolymer (A) may be produced by copolymerisation of olefin monomers with the above described comonomers, but may also be a grafted polymer, e.g. a polyolefin in which one or more of the comonomers are grafted onto the polymer backbone, as for example acrylic acid- or methacrylic acid-grafted polyethylene.

It is preferred that polymer component (A) is present in the composition in an amount of 30 to 70 wt %, more preferred of 40 to 70 wt % of the total composition.

The flame retardant composition used in the wire according to the invention further comprises a silicone-group containing compound (B).

In a preferred embodiment of the inventive composition, component (B) is a silicone fluid or a gum, or an olefin, preferably ethylene, copolymer comprising at least one silicone-group containing comonomer, or a mixture of any of these compounds.

Preferably, said comonomer is a vinylpolysiloxane, as e.g. a vinyl unsaturated polybishydrocarbylsiloxane.

Silicone fluids and gums suitable for use in the present inventions are known and include for example organopolysiloxane polymers comprising chemically combined siloxy units selected from the group consisting of $R_3SiO_{0.5}$, $R_2SiO$, $R^1SiO_{1.5}$, $R^1R_2SiO_{0.5}$, $RR^1SiO$, $R^1_2SiO$, $RSiO_{1.5}$ and $SiO_2$ units and mixtures thereof in which each R represents independently a saturated or unsaturated monovalent hydrocarbon radical and each $R^1$ represents a radical such as R or a radical selected from the group consisting of hydrogen, hydroxyl, alkoxy, aryl, vinyl or allyl radicals.

The organopolysiloxane preferably has a number average molecular weight $M_n$ of approximately 10 to 10,000,000. The molecular weight distribution (MWD) measurements were performed using GPC. $CHCl_3$ was used as a solvent. Shodex-Mikrostyragel ($10^5$, $10^4$, $10^3$, 100 Å) column set, RI-detector and a NMWD polystyrene calibration were used. The GPC tests were performed at room temperature.

The silicone fluid or gum can contain fumed silica fillers of the type commonly used to stiffen silicone rubbers, e.g. up to 50% by weight.

Copolymers of an olefin, preferably ethylene, and at least one silicone-group containing comonomer preferably are a vinyl unsaturated polybishydrocarbylsiloxane or an acrylate or methacrylate modified hydrocarbyl siloxane according to formula (II) and (III):

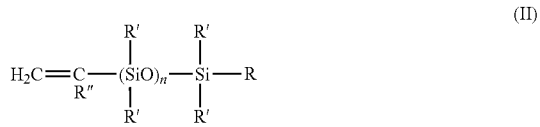

(II)

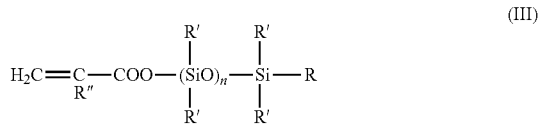

(III)

wherein in both (II) and (III) n=1 to 1000 and R and R' independently are vinyl, alkyl branched or unbranched, with 1 to 10 carbon atoms; aryl with 6 or 10 carbon atoms; alkyl aryl with 7 to 10 carbon atoms; or aryl alkyl with 7 to 10 carbon atoms. R" is hydrogen or an alkyl chain.

Such compounds e.g. are disclosed in WO 98/12253 the contents of which is herein enclosed by reference.

Preferably, component (B) is polydimethylsiloxane, preferably having a $M_n$ of approximately 1,000 to 1,000,000, more preferably of 200,000 to 400,000, and/or a copolymer of ethylene and vinyl polydimethylsiloxane. These components (B) are preferred due to commercial availability.

The term "copolymer" as used herein is meant to include copolymers produced by copolymerization or by grafting of monomers onto a polymer backbone.

It is preferred that silicone-group containing compound (B) is present in the composition in an amount of 0.5 to 40%, more preferred 0.5 to 10% and still more preferred 1 to 5% by weight of the total composition.

It is, furthermore, preferred that the silicone-group containing compound is added in such an amount that the amount of silicone-groups in the total composition is from 1 to 20 wt. %, more preferably from 1 to 10 wt %.

Component (C) of the flame retardant polymer composition of the wire according to the invention comprises all filler materials as known in the art. Component (C) may also comprise a mixture of any such filler materials. Examples for such filler materials are oxides, hydroxides and carbonates of aluminium, magnesium, calcium and/or barium.

Preferably, component (C) comprises an inorganic compound of a metal of groups 1 to 13, more preferred groups 1 to 3, still more preferred groups 1 and 2 and most preferred group 2, of the Periodic Table of Elements.

The numbering of chemical groups, as used herein, is in accordance with the IUPAC system in which the groups of the periodic system of the elements are numbered from 1 to 18.

Preferably, inorganic filler component (C) comprises a compound which is neither a hydroxide, nor a hydrated compound, more preferred comprises a compound selected from carbonates, oxides and sulphates, and most preferred comprises a carbonate.

Preferred examples of such compounds are calcium carbonate, magnesium oxide and huntite $Mg_3Ca(CO_3)_4$, with a particular preferred example being calcium carbonate.

Although inorganic filler (C) preferably is not a hydroxide, it may contain small amounts of hydroxide typically less than 5% by weight of the filler, preferably less than 3% by weight. For example there may be small amounts of magnesium hydroxide in magnesium oxide. Furthermore, although filler (C) is not a hydrated compound, it may contain small amounts of water, usually less than 3% by weight of the filler, preferably less than 1% by weight. However, it is most preferred that component (C) is completely free of hydroxide and/or water.

Preferably, component (C) of the inventive flame retardant polymer composition comprises 50 wt % or more of calcium carbonate and further preferred is substantially made up completely of calcium carbonate.

The inorganic filler may comprise a filler which has been surface-treated with an organosilane, a polymer, a carboxylic acid or salt etc. to aid processing and provide better dispersion of the filler in the organic polymer. Such coatings usually do not make up more than 3 wt. % of the filler.

Preferably, the compositions according to the present invention contain less than 3 wt. % of organo-metallic salt or polymer coatings.

It is preferred that inorganic filler (C) is present in the composition in an amount of more than 10 wt %, more preferred of 20 wt % or more, still more preferred of 25 wt % or more.

It is further preferred that inorganic filler (C) is present in the composition in an amount up to 70 wt %, more preferably of up to 55 wt % and most preferably of up to 50 wt %.

Preferably, the average particle size of the inorganic filler is 3 micrometer or below, more preferably 2 micrometer or below, still more preferably 1.5 micrometer or below, and most preferably 0.8 micrometer or below.

In addition to the above-mentioned components (A), (B) and (C), the composition may contain further ingredients, such as for example antioxidants and or UV stabilizers, in small amounts.

Furthermore, also other mineral fillers such as glass fibres may be part of the composition.

Preferably, the total amount of any further ingredients or additives to the composition, i.e. the total amount of all components apart from (A), (B), and (C), is 10 wt % or less, more preferably 5 wt % or less.

The compositions used in the present invention may be cross-linkable and accordingly cross-linked after extrusion of the polymer layer onto the conductor. It is well known to cross-link thermoplastic polymer compositions using irradiation or cross-linking agents such as organic peroxides and thus the compositions according to the present invention may contain a cross-linking agent in a conventional amount. Silane cross-linkable polymers may contain a silanol condensation catalyst.

The flame retardant polymer composition used in the present invention shows a superior abrasion resistance of at least 100 in the abrasion test according to ISO 6722, as further described below. Preferably, the composition has an abrasion resistance of at least 130 and still more preferably of at least 160.

Preferably, the polymer composition has a maximum processing temperature of 200° C. or below. The maximum processing temperature is defined in detail in the examples section.

In a preferred embodiment the flame retardant polymer composition used in the cable wire according to the invention has a good dripping behaviour so that preferably the original sample weight loss in the dripping test as further described in the examples section is 10 wt % or less, more preferred 5 wt % or less, still more preferred 3 wt % or less and most preferred is 0 wt %.

Preferably, the polymer composition used for the production of the flame retardant layer in the cable or wire according to the invention has an $MFR_2$ of 2.0 g/10 min or below, more preferably 1.6 g/10 min or below.

$MFR_2$ is measured in accordance with ISO 1133 at a load of 2.16 kg and a temperature of 190° C.

Preferably, the polymer composition used for the production of the flame retardant layer in the cable or wire according to the invention has an $MFR_2$ of 0.01 g/10 min or above, more preferably 0.05 g/10 min or above.

Preferably, component (A) of the polymer composition used for the production of the flame retardant layer in the cable or wire of the invention has an $MFR_2$ of 0.1 g/10 min or above, more preferably 0.5 g/10 min or above, and most preferably 1 g/10 min or above.

Preferably, component (A) of the polymer composition used for the production for the flame retardant layer in the cable or wire of the invention has an $MFR_2$ of 20 g/10 min or below, more preferably 15 g/10 min or above.

Further, preferably, the flame retardant polymer composition used in the wire according to the invention has an $MFR_{21}$ measured in accordance with ISO 1133 at a load of 2.16 kg and a temperature of 160° C. of 2 g/10 min or more, more preferably of 4 g/10 min or more.

The flame retardant polymer composition forming the layer of the cable or wire according to the invention may be prepared by
  a) preparation of a master batch comprising the silicone-group containing compound, additives and polymer followed by compounding with inorganic filler and matrix polymer or
  b) one step compounding of all components.

For mixing, a conventional compounding or blending apparatus, e.g. a Banbury mixer, a 2-roll rubber mill, Buss-co-kneader or a twin screw extruder may be used. Preferably, the composition will be prepared by blending them together at a temperature which is sufficiently high to soften and plasticise the polymer, typically a temperature in the range of 120 to 200° C.

The polymer composition preferably is extruded to form the flame retardant layer. This is preferably done at a line speed of at least 20 m/min, more preferably at least 60 In/min and most preferably at least 100 m/min.

The pressure used for extrusion preferably is 50 to 500 bar.

The present invention furthermore relates to a process for the production of a power or communications cable or wire comprising the extrusion of a polymer composition which comprises
  (A) an olefin homo- and/or copolymer,
  (B) a silicone-group containing compound, and
  (C) an inorganic filler,
wherein
the ratio of the $MFR_2$ measured under a load of 2.16 kg and at a temperature of 190° C. of component (A) to the $MFR_2$ measured under a load of 2.16 kg and at a temperature of 190° C. of the composition is higher than 3.5, as a flame retardant layer of the cable or wire, wherein the extrusion is performed at a line speed of at least of 20 m/min.

Preferably, extrusion is performed with a pressure of 50 to 500 bar.

In a preferred embodiment, in the process the cable or wire is a conduit or automotive wire consisting of an conductor core and the flame retardant layer, optionally further comprising a skin layer with a maximum thickness of 0.4 mm.

Further preferred embodiments of the process comprise the production of the wire or cable in any of the above described embodiments.

Still further, the present invention relates to the use of a polymer composition comprising
  (A) an olefin homo- and/or copolymer,
  (B) a silicone-group containing compound, and
  (C) an inorganic filler,
wherein
the ratio of the $MFR_2$ measured under a load of 2.16 kg and at a temperature of 190° C. of component (A) to the $MFR_2$ measured under a load of 2.16 kg and at a temperature of 190° C. of the composition is higher than 3.5, for the production of a flame retardant layer of a power or communication cable or wire by extrusion, wherein the extrusion is performed at a line speed of at least 20 m/min.

Of course, the preferred embodiments described-above for either the cable or wire, the polymer composition used for the production of the flame retardant layer and/or the processing parameters also apply for the use according to the present invention.

In the following the present invention is further illustrated by means of examples.

EXAMPLES

1. Compounding of Compositions

Flame retardant polymer compositions were produced by compounding together the components in a roller mill at a temperature of 180° C.

2. Produced Compositions and Materials Used

For the production of the comparative compositions and the compositions in accordance with the invention, the following materials were used:

| | |
|---|---|
| EMAA = | Ethylene methacrylic acid copolymer containing an amount of methacrylic acid as indicated in Table 1, having a melt flow rate at 190° C., 2.16 kg (MFR$_2$) of 3.0 g/10 min, and a density of 0.934 g/cm$^3$; |
| EAA = | Ethylene acrylic acid copolymer containing 9 wt. % of acrylic acid, having a MFR$_2$ of 8 g/10 min, and a density of 0.936 g/cm$^3$; |
| EBA = | Ethylene butyl acrylate copolymer containing 8 wt. % of butyl acrylate, and having an MFR$_2$ of 0.4 g/10 min. |
| Silicone (m.b.) = | Masterbatch, consisting of 40% polydimethylsilicone elastomer and 60% low-density polyethylene, |
| CaCO$_3$ (0.65) = | Ground, stearic acid coated calcium carbonate having an average particle size (d$_{50}$-value) of 0.65 microns, |
| CaCO$_3$ (1.4) = | Ground, stearic acid coated calcium carbonate having an average particle size (d$_{50}$-value) of 1.4 microns, |
| Stabilizer = | pentaerythityl-tetrakis(3-3',5'-di-tert.butyl-4'hydroxyphenyl)-propionate). |

The compositions were compounded as indicated above with amounts given in wt % of the components as indicated in Table 1.

3. Test Methods a) The melt flow rate MFR$_2$ of the compositions was measured in accordance with ISO 1133 at 190° C. and a weight of 2.16 kg. The melt flow rate MFR$_2$, of the compositions was measured in accordance with ISO 1133 at a weight of 21.6 kg, but at a temperature of 160° C.

b) The single wire burning test was done in full accordance with EN 60332-1. In order to fulfil the test the flame should extinguish after the flame from the 1 kW propane burner has been taken away and no charring should be visible within 50 mm from the upper support and below 540 mm. A wire fulfilling this criterion was marked "pass" in Table 1, otherwise it was marked "fail".

c) The dripping tendency of the materials was determined in the following way:

A 60×60×3 mm$^3$ plaque is pressed of the material and put on a steel frame having a mesh size of 12. The plaque is burned from below at an angle of 45° through the steel frame by a 1 kW Bunsen burner (950±50° C.) until the fire distinguish by itself (plaque completely burned). The burning drops fall down in water. The residues in the water are filtered, dried and weighed. The dripping tendencies are expressed as the residue collected in water divided by the original weight of the plaque multiplied by 100. This value is the percentage of the original sample weight that has been lost due to dripping. The method is based on the French method NF P 92-505.

d) The abrasion test has been done in full accordance with ISO 6722.

The abrasion resistance as reported in Table 1 is based on the testing of a wire sample based on a 0.75 mm$^2$ 18 AWG stranded copper conductor with the polymer layer wall thickness being 0.3 mm. The needle diameter used was 0.25 mm and the tested samples were not cross-linked.

e) Processing Test

The processing test was performed on a laboratory extrusion line. Different composition as listed in Table 1 were extruded onto a 1.5 mm$^2$ copper conductor and the insulation thickness was 0.7±0.1 mm. A pressure die was used and the line speed was 5 meter per minute. The laboratory extrusion line was equipped with three temperature zones. The compositions were extruded with different temperature settings.

The test is regarded as fulfilled if the cable isolation is extruded without any void formation. The maximum temperature of any of the temperature zones necessary for the tested composition to fulfil the test was registered and is reported as "maximum processing temperature" in Table 1.

f) The average particle size (d$_{50}$-value) was determined with a Sedigraph 5100. This sedimentation method determines particle size by measuring the gravity-induced travel rates of different size particles in a liquid with known properties. Since different particles rarely exhibit a uniform shape, each particle size is reported as an "Equivalent Spherical Diameter", the diameter of a sphere of the same material with the same gravitational speed.

The average particle size is defined as the particle size when 50 weight-% of the material is finer and 50 weight-% of the material is coarser.

4. Results

A comparison between the properties of the insulating layers of wires according to the invention (Examples 1 to 5) and that of comparative wires (Comparative Examples 1 to 4) as given in Table 1 shows that layers made in accordance with the invention have improved flame retardant properties as they pass the single wire burning test and have excellent dripping behaviour. At the same time, the layers exhibit improved mechanical properties as seen in an improved abrasion resistance. It is also noticed that EMAA is preferred to EAA due to a broader processing window as EAA based compounds generate voids already at processing temperatures in the excess of 150° C.

5. Cable Extrusion Data

Examples 6 a) and b) and Comparative Examples 5 a) and b) as listed in Table 2 relate to full scale extrusion at high line speeds of the compositions given in Example 3 and in Comparative Example 2 of Table 1, respectively. The extrusion was performed onto a 1.5 mm$^2$ copper conductor and the insulation thickness was 0.7±0.1 mm, at a temperature of 160° C.

As can be seen from Table 2, an improved extrusion behaviour is obtained in Examples 6 a) and b) because at high line speed the necessary screw speed is lower.

TABLE 1

| (wt %) | Ex. 1 | Ex. 2 | Ex. 3 | Ex. 4 | Ex. 5 | Ex. 6 | CoEx. 1 | CoEx. 2 | CoEx. 3 | CoEx. 4 |
|---|---|---|---|---|---|---|---|---|---|---|
| EMAA (%) | 56.9 | 57.3 | 63.55 | 47.3 | — | 47.3 | 47.3 | — | — | — |
| EMAA, acrylate content % | 9 | 9 | 9 | 4.3 | — | 6.2 | 1.2 | | | |
| EAA | — | — | — | — | 19 | — | — | — | — | — |
| EBA | — | — | — | — | 28 | — | — | 57.55 | 63.3 | 57.55 |
| silicone (m.b.) | 6.25 | 12.5 | 6.25 | 6.25 | 12.5 | | | 12.5 | 12.5 | 6.25 |
| CaCO₃ (0.65) | 36 | 30 | 30 | — | 40 | | 40 | 30 | — | — |
| CaCO₃ (1.4) | — | — | — | 40 | — | | — | — | 30 | 30 |
| Stabilizer | 0.3 | 0.2 | 0.2 | 0.2 | 0.2 | | 0.2 | 0.2 | 0.2 | 0.2 |
| IEC 332-1 | pass | pass | pass | pass | pass | pass | fail | fail | fail | fail |
| Dripping test | 0 | 0 | 0 | 0 | 0 | 0 | 0 | 18 | 30 | 30 |
| Abrasion test | 450 | | | | | | fail | 60 | fail | fail |
| Maximum processing temperature | 190 | 190 | 190 | 190 | 150 | 190 | 190 | 190 | >180 | >180 |
| MFR₂ component (A) | 3 | 3 | 3 | 6.4 | 0.89 | 9.5 | 7.5 | 0.45 | 0.45 | 1.1 |
| MFR₂ compound | 0.41 | 0.67 | 0.52 | 1.68 | 0.2 | 1.47 | 2.5 | 0.61 | 0.45 | 1.0 |
| ratio MFR₂ component (A)/MFR₂ compound | 7.3 | 4.48 | 5.77 | 3.81 | 4.45 | 6.46 | 3.0 | 0.74 | 0.96 | 1.1 |

TABLE 2

| | Ex. 6 a) | Ex. 6 b) | CoEx. 5 a) | CoEx. 5 b) |
|---|---|---|---|---|
| Line Speed | 140 | 70 | 140 | 70 |
| Screw speed | 41.2 | 22.7 | 48.5 | 22.6 |
| Pressure | 305 | 292 | 267 | 228 |
| Surface finish | excellent | excellent | excellent | excellent |

The invention claimed is:

1. A wire consisting of an inner conductor core surrounded by a flame retardant layer made of a polymer composition in a continuous process which composition comprises
   (A) a polar olefin copolymer,
   (B) a silicone-group containing compound, and
   (C) an inorganic filler which is neither a hydroxide nor a hydrated compound,
wherein the ratio of the MFR₂ measured under a load of 2.16 kg and at a temperature of 190° C. of component (A) to the MFR₂ measured under a load of 2.16 kg and at a temperature of 190° C. of the composition is higher than 3.5, and the wire has a length of at least 100 m.

2. A wire according to claim 1 wherein the flame retardant layer has a thickness of 0.1 to 4 mm.

3. A wire according to claim 1 which further has an outer skin layer with a maximum thickness of 0.4 mm.

4. A wire according to claim 1 wherein the conductor core area is from 0.1 to 400 mm².

5. A power or communications cable or wire comprising a flame retardant layer made of a polymer composition comprising
   (A) a polar olefin copolymer,
   (B) a silicone-group containing compound, and
   (C) an inorganic filler which is neither a hydroxide nor a hydrated compound,
wherein the ratio of the MFR₂ measured under a load of 2.16 kg and at a temperature of 190° C. of component (A) to the MFR₂ measured under a load of 2.16 kg and at a temperature of 190° C. of the composition is higher than 3.5, the cable or wire further comprising at least one further layer.

6. A power or communications cable or wire according to claim 5 wherein the flame retardant layer is produced in a continuous process and the cable or wire has a length of at least 100 m.

7. A power or communications cable or wire according to claim 5 wherein component (A) is a copolymer or a mixture of copolymers of an olefin with one or more comonomers selected from the group of non-substituted or substituted acrylic acids according to formula (I):

$$H_2C=CR-COOH \quad (I)$$

wherein R is H or an organic substituent.

8. A power or communications cable or wire according to claim 7 wherein the type of comonomer of component (A) is selected from acrylic acid and methacrylic acid.

9. A power or communications cable or wire according to claim 5 wherein the polymer composition passes the single wire burning test according to EN 60332-1.

10. A power or communications cable or wire according to claim 5 wherein the polymer composition has a maximum processing temperature of 200° C. or below.

11. A power or communications cable or wire according to claim 5 wherein the flame retardant layer has an abrasion resistance of at least 100.

12. A power or communications cable or wire according to claim 5 wherein the thickness of the flame retardant layer is from 0.1 to 4 mm.

13. A power or communications cable or wire according to claim 5 which has been produced by extruding the flame retardant layer with a line speed of at least 20 m/min.

14. A power or communications cable or wire according to claim 5 which has been produced by extruding the flame retardant layer onto with a pressure of 50 to 500 bar.

15. A power or communications cable or wire according to claim 5 wherein the amount of inorganic filler (C) is from 20 to 60 wt.-% of the total polymer composition.

16. A power or communications cable or wire according to claim 5 wherein component (B) is present in the composition in such an amount that the total amount of silicone groups in the composition is from 1 to 20 wt-%.

17. A power or communications cable or wire according to claim 5 wherein silicone-group containing compounds (B) is a silicone fluid and/or a gum and/or an olefin copolymer comprising a silicone-group containing monomer.

18. A power or communications cable or wire according to claim 5 wherein component (A) is present in the polymer composition in an amount of 30 to 70 wt.-%.

19. Process for the production of a power or communications cable or wire comprising the extrusion of a polymer composition which comprises
   (A) a polar olefin copolymer,
   (B) a silicone-group containing compound, and
   (C) an inorganic filler which is neither a hydroxide nor a hydrated compound,
wherein the ratio of the $MFR_2$ measured under a load of 2.16 kg and at a temperature of 190° C. of component (A) to the $MFR_2$ measured under a load of 2.16 kg and at a temperature of 190° C. of the composition is higher than 3.5, as a flame retardant layer of the cable or wire, wherein the extrusion is performed at a line speed of at least of 20 m/min.

20. Process according to claim 19 wherein the extrusion is performed with a pressure of 50 to 500 bar.

21. Process according to claim 19 wherein the cable or wire is a conduit or automotive wire consisting of a conductor core and the flame retardant layer, optionally further comprising a skin layer with a maximum thickness of 0.4 mm.

22. Method of producing a polymer composition comprising
   (A) a polar olefin copolymer,
   (B) a silicone-group containing compound, and
   (C) an inorganic filler which is neither a hydroxide nor a hydrated compound,
wherein the ratio of the $MFR_2$ measured under a load of 2.16 kg and at a temperature of 190° C. of component (A) to the $MFR_2$ measured under a load of 2.16 kg and at a temperature of 190° C. of the composition is higher than 3.5, for the production of a flame retardant layer of a power or communication cable or wire by extrusion, wherein the extrusion is performed at a line speed of at least of 20 m/min.

23. A method according to claim 22 wherein the extrusion is performed with a pressure of 50 to 500 bar.

24. A method according to claim 22 wherein the cable or wire is a conduit or automotive wire consisting of an conductor core and the flame retardant layer, optionally further comprising a skin layer with a maximum thickness of 0.4 mm.

* * * * *